US005168008A

United States Patent [19]

Yoshida et al.

[11] Patent Number: 5,168,008

[45] **Date of Patent: * Dec. 1, 1992**

[54] GLAZED CEMENT PRODUCT AND METHOD FOR MANUFACTURING THEREOF

[75] Inventors: Shigeo Yoshida, Yasu; Satoshi Kitagawa, Yoknichi, Shozo Harada, Handa, Tetsuya Koide, Nagoya, Manabu Hasegawa, Chita, all of Japan

[73] Assignees: National House Industrial Co., Ltd., Osaka; INAX Corporation,, Aichi, both of Japan

[ * ] Notice: The portion of the term of this patent subsequent to Jan. 10, 2006 has been disclaimed.

[21] Appl. No.: 534,322

[22] Filed: Jun. 5, 1990

Related U.S. Application Data

[60] Continuation of Ser. No. 257,615, Oct. 14, 1988, abandoned, which is a division of Ser. No. 816,533, Jan. 6, 1986, Pat. No. 4,797,319.

[30] Foreign Application Priority Data

Jan. 29, 1985 [JP] Japan .................................. 60-16103

[51] Int. Cl.[5] ........................ B28B 1/16; B32B 13/06; C04B 41/00

[52] U.S. Cl. .................................... 428/295; 264/133; 264/228; 264/229; 264/278; 264/333; 428/447; 428/469; 428/542.2; 428/703

[58] Field of Search ................. 264/62, 133, 228, 229, 264/231, 277, 278, 333; 427/376.2; 428/703, 447, 469, 312.4, 312.6, 312.8, 542.2, 293–295; 106/86, 99, DIG. 2, 672

[56] References Cited

U.S. PATENT DOCUMENTS

| | | | |
|---|---|---|---|
| 1,684,663 | 9/1928 | Dill | 264/228 |
| 1,928,435 | 9/1933 | Powell | 264/145 X |
| 2,312,293 | 2/1943 | Weiss . | |
| 2,319,105 | 5/1943 | Billner | 264/27 |
| 2,562,477 | 7/1951 | Ramsay | 264/62 |
| 2,702,424 | 2/1955 | Bakker | 264/256 X |
| 3,217,075 | 9/1965 | Kiell-Berger | 264/228 |
| 3,489,626 | 1/1970 | Rubenstein | 156/86 |
| 3,608,011 | 9/1971 | Jones | 264/256 X |
| 3,903,222 | 9/1975 | Brown, Jr. | 264/333 X |
| 4,407,769 | 10/1983 | Harada et al. | 264/60 |
| 4,797,319 | 1/1989 | Yoshida et al. | 264/229 |

FOREIGN PATENT DOCUMENTS

| | | |
|---|---|---|
| 2264942 | 11/1975 | France . |
| 56-48464 | 11/1981 | Japan . |

*Primary Examiner*—Karen Aftergut
*Attorney, Agent, or Firm*—Nikaido, Marmelstein, Murray & Oram

[57] ABSTRACT

A steel reinforced cement product having substantially increased strength made by: positioning prestressed reinforcing steel in a mold cavity; providing a cementitious mixture in the mold cavity about the reinforcing steel in an amount sufficient to fill the mold cavity to a predetermined extent; curing the reinforced cementitious-steel composite article in the mold; drying the article; applying a glaze to the surface of the dried article; burning the glaze; cooling the burned, glazed article, whereby reducing the strength of the composite article; hydrating the reduced strength composite article; and then recurring the thus produced article.

2 Claims, 4 Drawing Sheets

GLAZED CEMENT PRODUCT AND METHOD FOR MANUFACTURING THEREOF

This application is a continuation of application Ser. No. 257,615, now abandoned, filed Oct. 14, 1988which is a division of application Ser. No. 816,533, filed Jan. 6, 1986, now U.S. Pat. No. 4,797,319.

BACKGROUND OF THE INVENTION

The present invention relates to a glazed cement product and method for manufacturing thereof wherein the glazed cement product can be obtained by applying a glaze onto the surface of a molded body of cement, burning the glazed body and hydrating the burned body to harden, and improved in the strength of a molded body of cement by using, for example, prestressed concrete steel.

Hitherto, there was employed a method of laying reinforcing steel within a glazed cement product in order to increase the strength thereof. The product can be obtained by the following steps.

At first, a kneaded mixture of cement comprising cement, aggregate, water and the like is poured into a form wherein reinforcing steel is laid beforehand. Next, the resulting molded body of cement is hardened by curing in air for a prescribed time. Then a glaze is applied to the surface of the molded body of cement, the glazed product is burned at a prescribed temperature and then cooled in air. After such casting, the burned molded body of cement is hydrated to harden it thus manufacturing a hardened glazed cement product.

However, in case of manufacturing the above-mentioned conventional product, thermal stress is generated, while burning and cooling, by the difference in coefficients of thermal expansion between the reinforcing steel and the cementitious material causing cracks in portions of the cement material. For example, the coefficient of thermal expansion of reinforcing steel is about $17.3\times10^{-6}$° C.$^{-1}$ and that of a molded body of cement is about 7 to $10\times10^{-6}$° C.$^{-1}$ which, of course, varies depending on the types of aggregate used or mixing ratio of cement, aggregate and water. Accordingly the reinforcing steel expands about twice as much as a molded body of cement. As a result, the conventional product has problems because its strength is decreased rather than increased as would be expected of such a product containing reinforcing steel.

Accordingly, it is an object of the present invention to improve or remove the above-mentioned conventional drawbacks, and provide a glazed cement product wherein the generation of cracks is controlled and method for manufacturing such.

SUMMARY OF THE INVENTION

According to the present invention, there is provided a method for manufacturing a glazed cement product comprising the steps in sequence of:

(a) preparing a kneaded mixture of cement,
(b) pouring the resulting kneaded mixture into a form or on a bed wherein reinforcing steel is laid,
(c) molding a molded body of cement,
(d) curing the molded body of cement,
(e) applying a glaze onto a surface of the cured molded body of cement,
(f) burning the glazed molded body of cement,
(g) cooling the burned mold body of cement,
(h) hydrating to harden the cooled molded body of cement, characterized in that the thermal stress, which is generated during burning and cooling the molded body because of differences between the coefficient of thermal expansion of the reinforcing steel and that of the rest of the cementitious body, is absorbed by a stress absorbing member disposed about the reinforcing steel between it and the rest of the cementitious body; and further characterized by hydrating the cooled cementitious molded product an amount is sufficient to harden such whereby to recover mechanical strength lost in the burning step. This invention also encompasses the glazed cement product so produced.

The glazed cement product of the present invention has its mechanical strength improved by means of reinforcing steel, for example, and by means of hydration of the burned and cooled molded cementitious material to harden it. That is to say, the glazed cement product of the present invention can realize the combination of two techniques which has not been possible hitherto, whereby excellent mechanical strength can be obtained.

The above and other objects of the invention will be seen by reference to the description taken in connection with the accompanying drawings.

DETAILED DESCRIPTION

Figure 1:
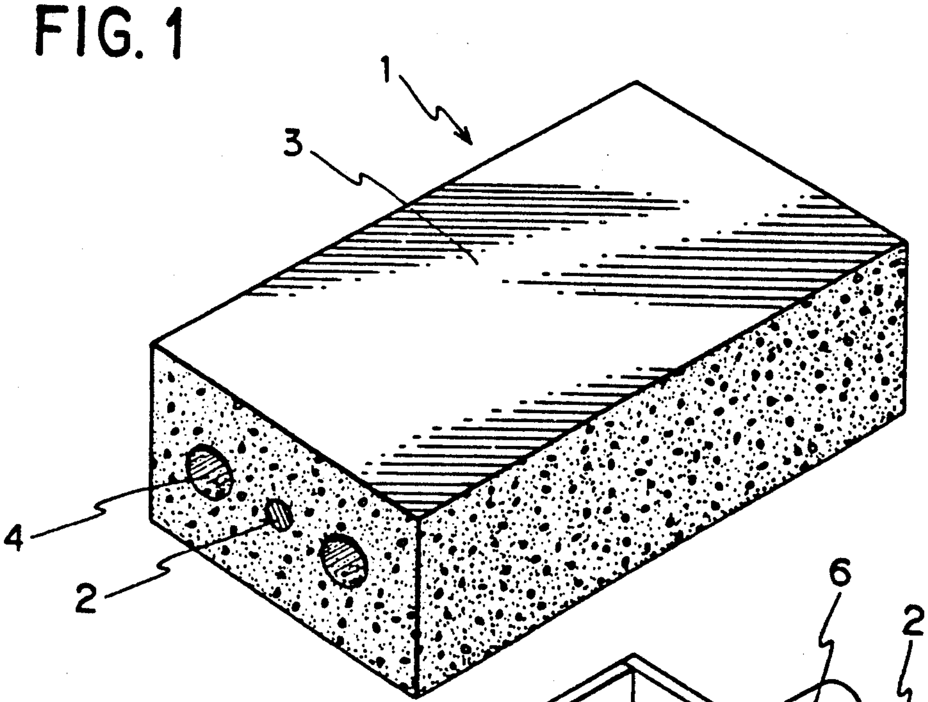
FIG. 1 is a perspective view of an embodiment of a glazed cement product of the present invention.

FIG. 1 is a perspective view of an embodiment of a glazed cement product 1 of the present invention. In FIG. 1, numeral 2 is reinforcing steel, numeral 3 is a glaze applied thereon and numeral 4 is a cavity for lightening the product 1 and containing metal works to be inserted therein. In manufacturing this kind of cement product, a kneaded mixture of cement is prepared at first. The kneading of the mixture of cement can be carried out by using depositing machine.

The mixing ratio of the kneaded mixture of cement and the kinds of materials mixed are appropriately selected in accordance with shape, use, and the like of cement products.

Next, the mixture of cement kneaded in such a manner as described above is poured into a form 5 in order to be cured in air for prescribed time. Reinforcing steel 2 and a core 6 for forming the cavity 4 are laid in the form 5 beforehand. The core 6 is made of steel, synthetic resin, and the like.

As a method for manufacturing molded body of cement 7, an immediate stripping method of construction is employable besides a pouring method. This immediate stripping method of construction comprises steps of placing a kneaded mixture of cement on a bed in succession, curing resulting molded body and cutting the cured molded body in a prescribed dimension.

Figure 4:
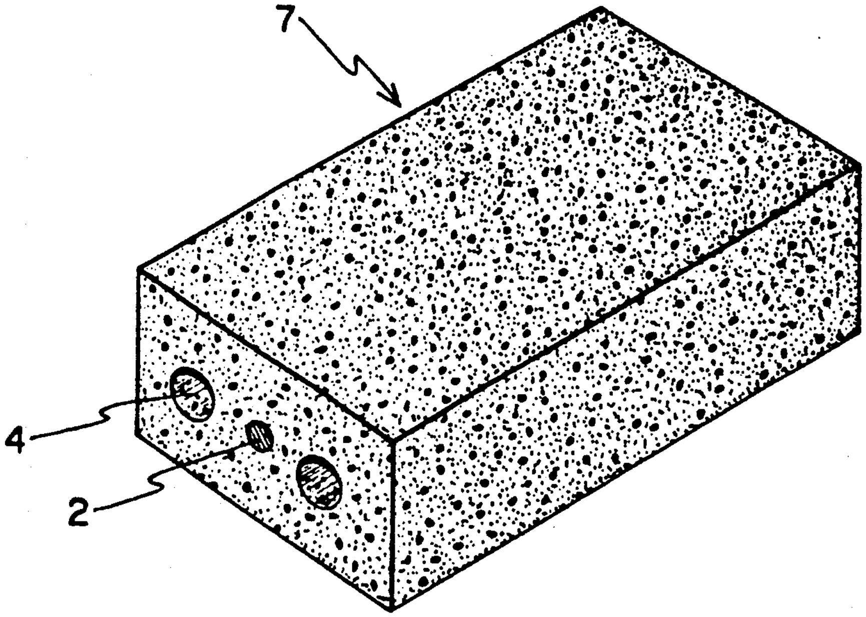
FIG. 4 is a perspective view of a molded body of cement in the present invention.
Figure 5:
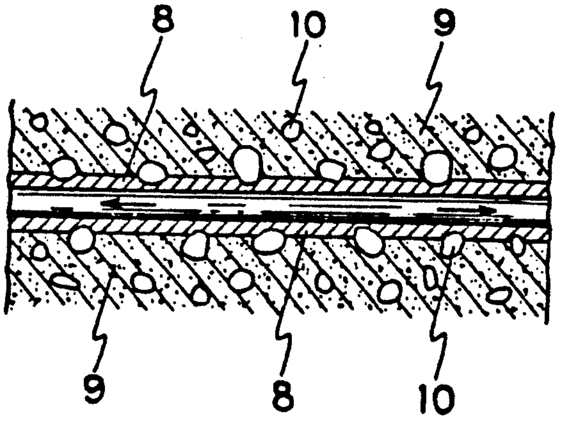
FIGS. 5 and 6 are schematic vertical sectional views of the molded body of cement in the present invention showing a principle of absorption of thermal stress generated while burning is carried out.
Figure 6:
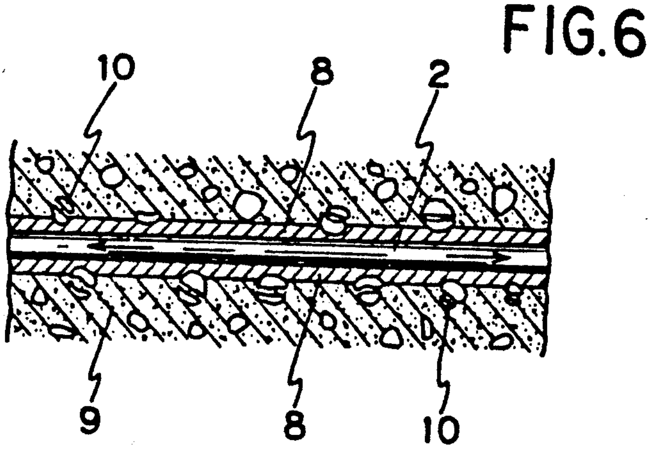

The curing methods are not necessarily limited to those described above. The molded body is hardened to such an extent that the molded body of cement 7 (shown in FIG. 4) maintains its shape sufficiently and makes it difficult for the reinforcing steel to slide with respect to its portion of adjacent cement.

After curing is carried out, the form 5 is stripped and the resulting molded body of cement 7 is dried by heating at a temperature of 50 to 300° C. for 3 to 72 hours. The heating temperature and time vary depending on the thickness of product, season, and the like.

After being dried, there is applied to the surface of the molded body of cement 7 a glaze preparatory to it being burned in a roller hearth kiln, for example.

The drying step can be carried out independently, but it can also be carried out in succession without interrupting in such a manner that drying is carried out in the pre-heating zone and then burning is carried out in the burning zone in the kiln used in the following step.

As described above, while the burning step is being carried out, there is generated a thermal stress between the reinforcing steel 2 and the cement material 9 caused by the difference of coefficient of thermal expansion between them. The thermal stress tends to generate cracks in the area of the cementitious body between the reinforcing steel 2 and the adjacent portion of cement material 9 proximate thereto. However, this kind of thermal stress can be absorbed by means of stress-absorbing means, i.e. foam light-weight aggregate 10 and/or a stress-absorbing layer 8.

That is to say, foam light-weight aggregate 10 contained in the kneaded mixture of cement is destroyed or compressed by above-mentioned thermal stress so as to allow sliding between the portion of cement material 9 and the stress-absorbing layer 8, whereby the thermal stress is dispersed to prevent crack. As a result, cracks are not generated in the stress-absorbing layer 8 and the adjacent portion of cement material 9.

The stress-absorbing layer 8 acts like foam light-weight aggregate 10, that is to say, plays a part in absorbing the sliding caused by the difference of coefficient of thermal expansion between the reinforcing steel 2 and the adjacent portion of cement material 9.

The above-mentioned two means (i.e. foam light-weight aggregate and the stress-absorbing layer) can be employed individualy, but joint use thereof are more effective to prevent the generation of crack.

Examples employed as stress-absorbing layer are mortar layer such as pearlite mortar and vermiculite mortar, glass, plastic, and the like.

Examples employed as foam light-weight aggregate are natural light-weight aggregate such as volcanic gravel, pumice and lava, artificial light-weight aggregate such as pearlite powder, and industrial by-product such as coal ash and slag.

After being burned, the molded body of cement 7 is cooled in air. During the cooling period there is also generated thermal stress between the reinforcing steel 2 and the adjacent portion of the cement material 9. However such thermal stress is absorbed in such a manner as described above by the stress-absorbing portion (i.e. stress-absorbing layer and foam light-weight aggregate).

After being cooled, the molded body of cement 7 is dipped in water for about 10 to 60 minutes in order to absorb moisture. The dipping time is not limited to this range and varies depending on the thickness of the product, the season, and the like. Further, a showering method can also be employed since the main purpose of this step is to supply water to the products from which water has been removed while burning. However, this step of dipping in water is carried out for rapid absorption of moisture and is omissible.

Finally, the molded body of cement 7 is hydrated to harden. In hydrating to harden, appropriate methods such as steam curing, dipping in water and water spray curing are employable. Various conditions such as temperature and time for curing are determined in consideration of initial cost, curing cost, performance of product, and the like.

The hydration for curing of the glazed cement product 1 obtained in such a manner as described above, in which whose strength has been decreased by dehydration in the layer of hydrate on burning, lets water get into the hydrate through its shell, which has been broken while burning, is carried out so as to promote the hydration reaction of unreacted cement component, which allows the cement product 1 to achieve its full strength. Further the strength of the cement product is recovered since hydrate created during hydration for curing fills up gaps generated while burning is carried out. Accordingly the strength of the cement product 1 of the present invention is almost equal to that of the usual cement products which are obtained by hydrating to harden unburned molded bodies. This technique of hydration to harden has already been known in the specification of Japanese Examined Patent Publication No. 48464/1981, which invention was developed by the instant inventors.

In the present invention, pretension can be given to reinforcing steel beforehand when the kneaded mixture is poured into a form or on a bed in order to effectively prevent the generation of cracks between the reinforcing steel and the adjacent portion of cement material proximate thereto while burning is carried out. In this case, prestressed concrete steel such as prestressed concrete wire, or prestressed concrete bar is preferably employed. Pretension given to the prestressed concrete steel varies depending on the strength of molded body of cement. In case that the pretension is too small, the generation of cracks can not be sufficiently prevented. On the other hand, in case that the pretension is too large cement products are destroyed since the strength of the molded body of cement decreases with a rise in burning temperature.

Prestressed concrete steel is compulsorily extended because of the pretension given to it. Therefore, while burning is carried out, with respect to the expansion of prestressed concrete steel to such an extent within the extension thereof caused by pretension, the prestressed concrete steel tends to absorb the expansion by way of extension thereof. That is to say, provided that the extension of 10 mm is given to prestressed concrete steel by means of pretension, the prestressed concrete steel absorbs the expansion by extending itself until its expansion caused by heating exceeds 10 mm. Accordingly, the apparent length of the prestressed concrete steel is constant whereby cracks between the prestressed concrete steel and the adjacent portion of cement material 9 proximate thereto are avoided.

After burning, the pretension given to the prestressed concrete steel is lost. Accordingly the thermal stress generated while cooling is carried out is absorbed by means of stress-absorbing layer generated by the fall of strength of the adjacent portion of cement material. That is to say, in case of giving pretension to prestressed concrete steel, the thermal stress generated while burning is absorbed by the extension which is compulsorily given to prestressed concrete steel, and the thermal stress generated while cooling is absorbed by stress-absorbing layer.

As described above, the pretension in the present invention is different from conventional pretensioning for reinforcement in viewpoint of purpose, action and effect.

A glazed cement product of the present invention is manufactured according to the following method, for example.

At first a kneaded mixture of cement is prepared by using pearlite aggregate as foam light-weight aggregate. The mixing ratio of the kneaded mixture of cement is as follows:

| | |
|---|---|
| ordinary portland cement: | 35.8 parts by weight |
| pearlite/aggregate: | 45.8 parts by weight |
| pearlite powder: | 18.2 parts by weight |
| water reducing agent: | 0.2 parts by weight |
| water (water-cement ratio): | 0.51 |

The kneading of the mixture of cement is carried out by using a depositing machine.

Figure 2:
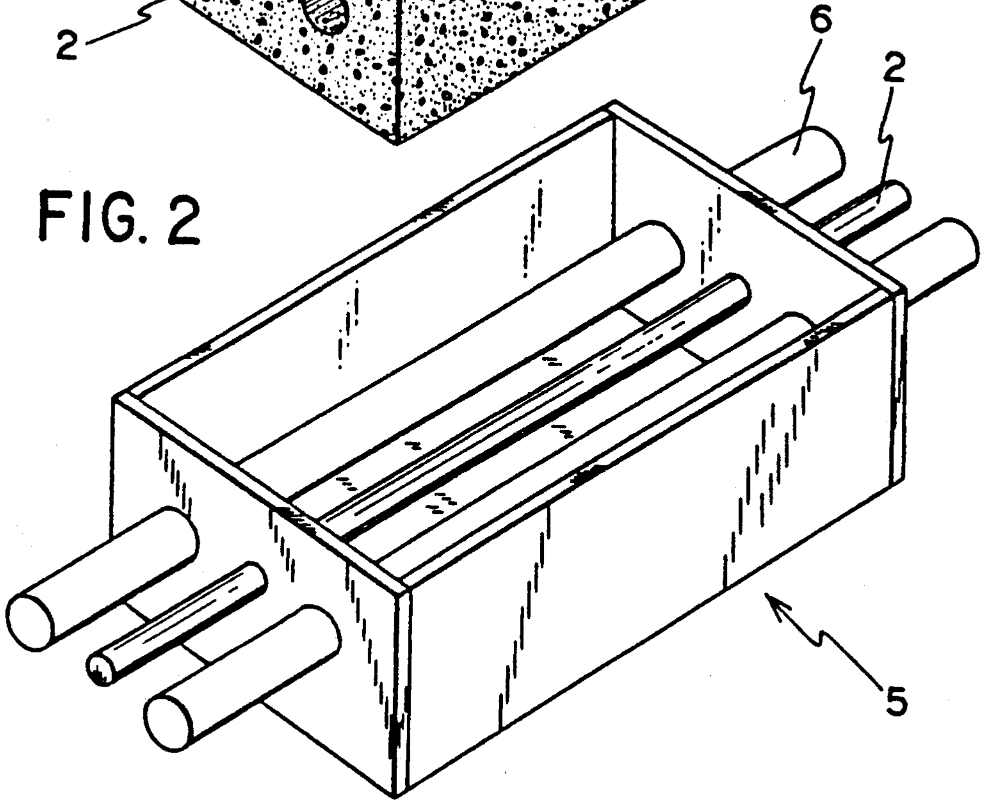
FIG. 2 is a perspective view of a form including reinforcing steel used in manufacturing the glazed cement product shown in FIG. 1.
Figure 3:
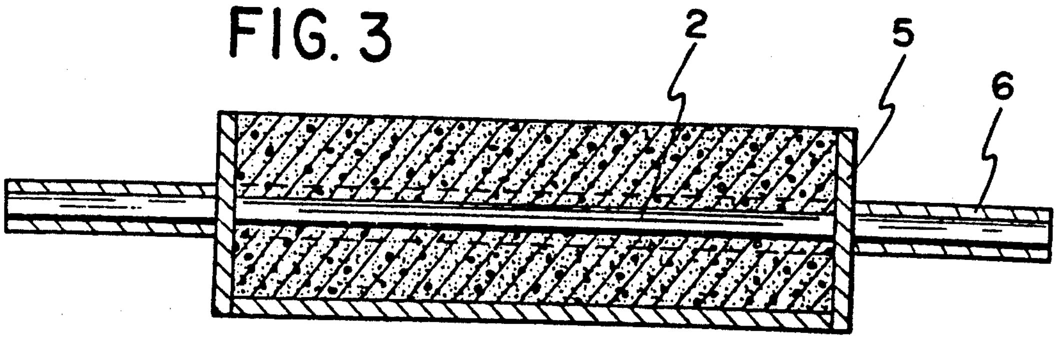
FIG. 3 is a vertical sectional view of the form of FIG. 2 wherein a kneaded mixture of cement is poured.

Next, the mixture of cement, kneaded in such a manner as described above, is poured into a form as shown in FIGS. 2 and 3 in order to be cured in air for 4 hours. Prestressed concrete steel of 2.9 mm in diameter is laid under pretension in the form beforehand. The pretension given to the steel is 0.5 t.

After curing is carried out, the form is stripped and the resulting molded body of cement is dried by heating at a temperature of 200° C. for 2 hours. After being dried, the molded body of cement has a glaze applied onto the surface thereof and is thus adapted to be burned in a roller hearth kiln, for example, at a temperature of 850° C. for 1 hour. The roller hearth kiln used in this embodiment is such that the internal width is 80 cm, the height from the roller is 20 cm and the length is 30 m.

After being burned, the molded body of cement is dipped in water for 10 minutes in order to absorb moisture.

Finally the molded body of cement is placed in a curing room and cured in steam for 3 days at a temperature of 60° C. and relative humidity of 95% which allows the rehydrated cement to harden.

EXAMPLE 1

A glazed cement product was produced under the conditions shown in Table 1. The type of cement employed was ordinarily portland cement, water reducing agent used was 0.5% by weight to cement, cement-aggregate ratio in volume was 1 to 4 and water-cement ratio was 45% by weight. As a reinforcing steel, stranded steel wire comprising two prestressed steel wires of 2.9 mm in diameter was employed.

The above-mentioned five conditions were the same as in Examples 2 to 4 and Comparative Examples 1 to 6.

At first a kneaded mixture of cement was prepared under the conditions shown in Table 1 and described above.

TABLE 1

| | Aggregate | Specific gravity of concrete | Compressive strength (kg/cm$^2$) |
|---|---|---|---|
| Example 1 | Foamed soda glass | 1.2 | 120 |
| Example 2 | Foamed shale | 1.4 | 240 |
| Example 3 | Porcelain chamotte | 1.9 | 470 |
| Example 4 | Porcelain chamotte | 1.9 | 470 |
| Comparative Example 1 | Foamed shale | 1.4 | 240 |
| Comparative Example 2 | Foamed shale | 1.4 | 240 |
| Comparative Example 3 | Foamed shale | 1.4 | 240 |
| Comparative Example 4 | Porcelain chamotte | 1.9 | 470 |
| Comparative Example 5 | Porcelain chamotte | 1.9 | 470 |
| Comparative Example 6 | Porcelain chamotte | 1.9 | 470 |

The kneading of the mixture of cement was carried out by using a depositing machine.

Next, the mixture of kneaded cement was poured into a form and allowed to cure in air for 24 hours. Stranded steel wire was laid in the form beforehand. Pretention was not given to the stranded steel wire.

After curing was carried out, the form was stripped and the resulting molded body of cement was dried by heating at a temperature of 300° C. for 4 hours. After being dried, the molded body of cement was burned in a roller hearth kiln at a temperature of 880° C. for 2 hours.

After being burned, the molded body of cement was dipped in water for 10 minutes in order to absorb moisture.

Finally the molded body of cement was placed in curing room and cured in steam for 1 day at a temperature of 60° C. and relative humidity of 100% to allow the hydration cement to harden.

Figure 7:
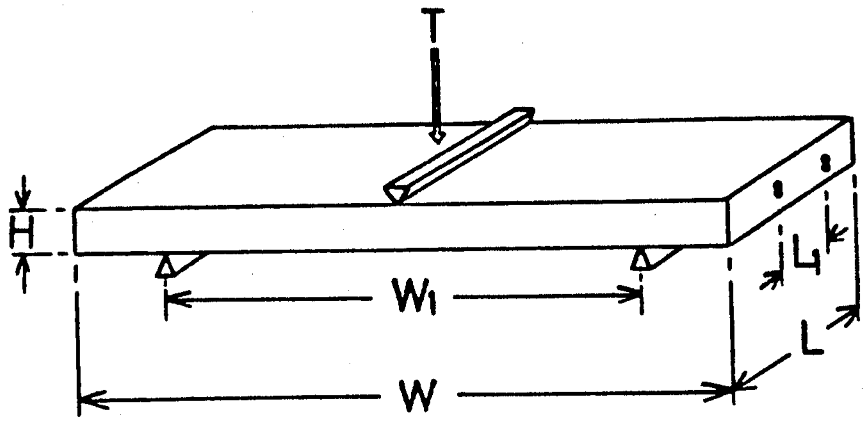
FIG. 7 is a perspective view showing a bending test of a molded body of cement.

The obtained cement product is shown in FIG. 7. In FIG. 7, dimensions of W, $W_1$, L, $L_1$ and H are as follows:

W:1200 mm
$W_1$:900 mm
L:270 mm
$L_1$:100 mm
H:66 mm

With respect to the obtained cement product, the strength of the molded body of cement was measured based on JIS A 1408 in order to confirm the effect of pretension given to the stranded steel wire. The load was applied along the line T shown in FIG. 7. The resuls are summarized in Table 2.

Test pieces (Example 1) were obtained by cutting the cement product shown in FIG. 7 with a diamond cutter.

Figure 8:
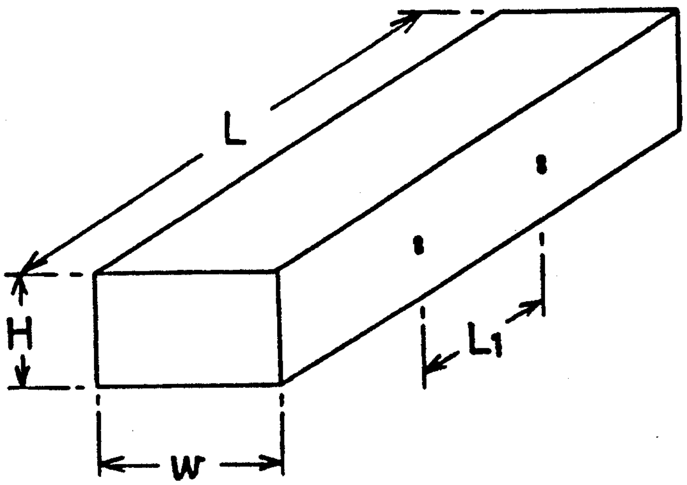
FIG. 8 is a perspective view of a test piece for measuring propagation velocity.

The obtained test piece is shown in FIG. 8. In FIG. 8, dimensions of ω, L, $L_1$ and H are as follows:

ω:100 mm
L:270 mm $L_1$:100 mm
H:66 mm

EXAMPLE 2

The procedure of Example 1 was repeated except that pretension of 1.5 ton was given to the stranded steel wire and foamed shale was employed as aggregate instead of foamed soda glass.

EXAMPLE 3

The procedure of Example 1 was repeated except that pretension of 1.8 ton was given to the stranded steel wire and porcelain chamotte was employed as aggregate instead of foamed soda glass.

COMPARATIVE EXAMPLES 1 to 3

The procedure of Example 2 was repeated except that pretension was not given to the stranded steel wire (Comparative Example 1), pretension of 1.0 ton was given (Comparative Example 2) and pretension of 1.8 ton was given (Comparative Example 3).

COMPARATIVE EXAMPLES 4 and 5

The procedure of Example 3 was repeated except that pretension was not given to the stranded steel wire (Comparative Example 4) and pretension of 2.7 ton was given (Comparative Example 5).

EXAMPLE 4

The procedure of Example 3 was repeated except that reinforcing steel of 6 mm in diameter without pretension was employed instead of stranded steel wire and mortar layer of 3 to 5 mm in thickness was coated around the reinforcing steel by dipping the reinforcing steel into kneaded pearlite mortar beforehand (cement-aggregate ratio in volume was 1 to 4).

COMPARATIVE EXAMPLE 6

The procedure of Example 4 was repeated except that a mortar layer was not coated around the reinforcing steel.

Figure 9:
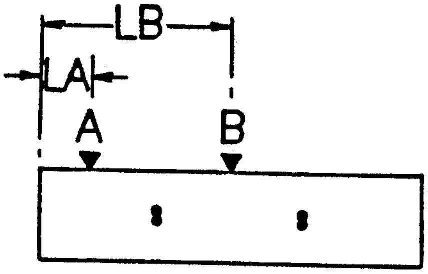
FIG. 9 is a side view of Examples 1 to 3 showing crack generated while burning and cooling are carried out, and measuring points of propagation velocity of ultrasound.
Figure 10:
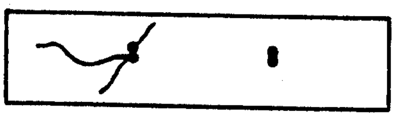
FIGS. 10 to 14 are side views of Comparative Examples 1 to 5 respectively showing cracks generated while burning and cooling are carried out.
Figure 11:
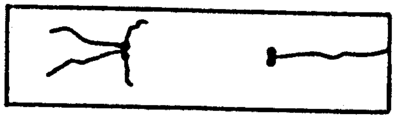
Figure 12:

With respect to above-mentioned Examples 1 to 4 and Comparative Examples 1 to 6, the generation of cracks was observed by the naked eye. The states of the generation of crack are shown in FIGS. 9 to 16. FIG. 9 corresponds to Examples 1 to 3, FIG. 10 to Comparative Example 1, FIG. 11 to Comparative Example 2, FIG. 12 to Comparative Example 3, FIG. 13 to Comparative Example 4, FIG. 14 to Comparative Example 5, FIG. 15 to Example 4 and FIG. 16 to Comparative Example 6, respectively.

Further, propagation velocity was measured by using ultrasound. The measurement was carried out with respect to two test pieces and valued by the average. The measuring points are shown in FIG. 9, which are the same as in FIGS. 10 to 16. In FIG. 9, AL is 40 mm and BL is 135 mm. The result are summarized in Table 2.

TABLE 2

| | Propagation velocity at measuring point A [km/sec] | Propagation velocity at measuring point B [km/sec] | *Load of unburned molded body of cement at generation of crack Pcr [kg/cm²] |
|---|---|---|---|
| Example 1 | 2.55 | 2.56 | |
| Example 2 | 2.72 | 2.71 | 300 |
| Example 3 | 2.93 | 2.91 | 230 |
| Example 4 | 2.92 | 2.92 | |
| Comparative Example 1 | 2.10 | 2.73 | 130 |
| Comparative Example 2 | 2.21 | 2.74 | 250 |
| Comparative Example 3 | 2.70 | 2.05 | 320 |
| Comparative Example 4 | 2.35 | 2.92 | 182 |
| Comparative Example 5 | 2.33 | 2.29 | 300 |
| Comparative Example 6 | 2.32 | 2.90 | |

*Measured in order to confirm the effect of pretension given to strand steel wire.

Figure 13:
Figure 14:

From FIGS. 9 and 13, it is found that the use foam light-weight aggregate is effective in preventing the generation of crack caused by thermal stress while burning and cooling. From FIGS. 9 and 10, however, it is also found that the type of foam light-weight aggregate is limited in case of using only foam light-weight aggregate without either using a mortar layer (stress-absorbing layer) or giving pretension to the stranded steel wire.

From FIGS. 9 to 12, and FIGS. 9, 13 and 14, it is found that it is effective to give pretension to stranded steel wire in order to absorb thermal stress. It is furthermore found that a preferable range of pretension exists corresponding to the strength of molded body of cement. That is to say, in FIGS. 12 and 14, there is generated crack between two stranded steel wire from the upper surface of test piece to the lower surface thereof. This crack occurs because of excessive pretension whereby test pieces are destroyed as a result of the fall of the strength of molded body of cement while the burning temperature rises.

Figure 15:
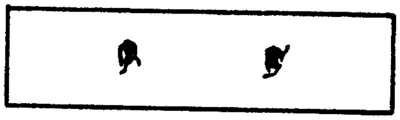
FIG. 15 and 16 are side views of the Example 4 and Comparative Example 6 respectively showing cracks generated while burning and cooling are carried out.
Figure 16:
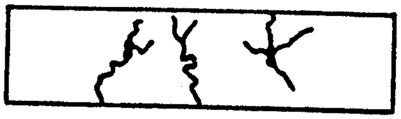

From FIGS. 15 and 16, it is found that the use of layer of mortar is effective in preventing the generation of crack. The crack observed in FIG. 15 in fact occurred only in the mortar layer. For the sake of easy understanding of generation of crack, the crack is illustated larger than it really is.

From Table 2, the above-mentioned description can be confirmed numerically. The propagation velocity lessens on account of the existence of crack.

According to the present invention, the generation of crack between reinforcing steel and the adjacent portion of the cement material can be effectively absorbed by means of use of a stress-absorbing portion and/or pretension given to reinforcing steel.

What is claimed is:

1. In a process of producing a glazed, steel reinforced, molded decorative article comprising said reinforcing steel, and cement having a coefficient of thermal expansion different from a thermal coefficient of said steel, which process comprises: preparing a kneaded mixture comprising said cement and water; providing a form or bed corresponding to a size and shape of said molded article; disposing said reinforcing steel in said form or bed; substantially filling said form or bed with said kneaded mixture comprising said cement and water around and adjacent to said reinforcing steel; curing said molded article at least an amount sufficient to produce a composite article comprising said reinforcing steel and said cement; drying said composite article; applying a glaze to a surface of said cured, dried article; burning said glazed article under conditions that cause said cured cement and said reinforcing steel to expand, and that cause said cement to at least partially dehydrate at least around and adjacent to said reinforcing steel; cooling said burned article; absorbing additional moisture in said at least partially dehydrated cement; and then, again, curing said cooled article an amount sufficient to produce said decorative article having substantial strength;

the improvement comprising substantially eliminating formation of cracks in said cement at least around and adjacent to said reinforcing steel during said burning of said glazed article by pretensioning said reinforcing steel prior to said filling of said form or bed with said cement, and wherein said pretensioning of said reinforcing steel is sufficient to prevent said formation of cracks in said cement during said burning while being insufficient to cause destruction of said decorative article.

2. A decorative, glazed cement product manufactured according to claim 1.

* * * * *

UNITED STATES PATENT AND TRADEMARK OFFICE
CERTIFICATE OF CORRECTION

PATENT NO. : 5,168,008

DATED : December 1, 1992

INVENTOR(S) : Yoshida, et. al.

It is certified that error appears in the above-identified patent and that said Letters Patent is hereby corrected as shown below:

On the Title page, item [75], change the name of the city of the second inventor from "YOKNICHI" to --YOKAICHI--.

Signed and Sealed this

Thirtieth Day of November, 1993

Attest:

BRUCE LEHMAN

*Attesting Officer*

*Commissioner of Patents and Trademarks*